March 30, 1937 — F. LOHMAN — 2,075,530
WARNING SPEED INDICATOR
Filed Aug. 28, 1933
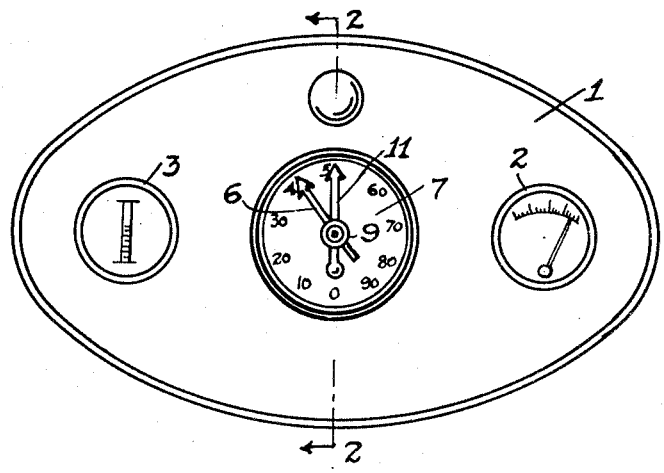
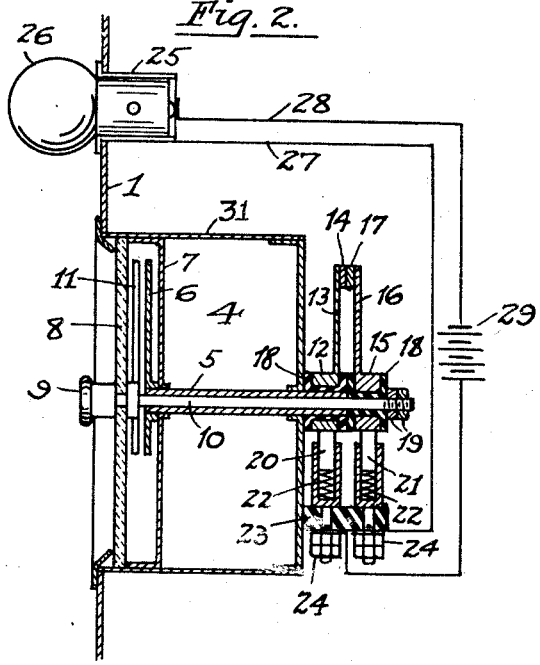
INVENTOR:—
Francis Lohman.
WITNESSES:—
William E. Simpson
D. J. Hypon Patented Mar. 30, 1937

2,075,530

UNITED STATES PATENT OFFICE 2,075,530

WARNING SPEED INDICATOR

Francis Lohman, Detroit, Mich.

Application August 28, 1933, Serial No. 687,125

4 Claims. (Cl. 200—56)

My invention relates to warning speed indicators for automobiles and other vehicles and its principal object is to provide means whereby the driver is automatically warned that he is exceeding a predetermined speed limit. Such a device is of great utility not only in preventing deaths, injuries and property loss due to accidents but also in the avoidance of prosecution and fines for exceeding the lawful speed limits in various localities. Another important use for such a device is to warn owners of new cars when exceeding the maximum speed specified by the manufacturers for breaking in the same.

Another object of my said invention is to provide a device of the character referred to which is so constructed and located that the driver is compelled to take notice thereof so that it is unnecessary for him to watch the speedometer and so divert his attention from the business of driving the vehicle.

A further object of the said invention is to provide a device of the character described which is simple in construction and economical to manufacture.

With these and other objects in view the invention consists in the improved construction, arrangement, and combination of parts which will be hereinafter fully described, reference being had to the accompanying drawing, which illustrates a preferred embodiment thereof, in which drawing—

Figure 1 is a front elevation of an instrument panel having my invention applied thereto.

Figure 2 is a section on line 2—2 of Figure 1, drawn to an enlarged scale illustrating the details of construction.

Like characters designate corresponding parts throughout the several views.

1 is the panel having the ammeter 2 and oil gauge 3 attached thereto and 31 is the speedometer casing set into an opening in the panel and containing in the space 4 the regular speed-responsive mechanism of any ordinary construction, which is not herein shown or described since it forms no part of the present invention. 5 is a hollow shaft connected to the said mechanism and 6 is the regular pointer by which the speed of travel is indicated upon the dial 7. 8 is the glass front of the instrument and 9 is a knurled knob on the outside of the same which is mounted upon a shaft 10, the said shaft passing through the shaft 5 from front to back. Upon the shaft 10 and in front of the pointer 6 is a second pointer 11 which is for the purpose of indicating the travelling speed at which my device is intended to go into operation. Upon the rear end of the shaft 5 is mounted a hub 12 and integral with this hub is a contact arm 13 provided with a contact block 14. Rearwardly of the hub 12 is a similar hub 15 secured to the shaft 10 and carrying the contact block 17 on arm 16. The contact block 17 is formed of a substantial, arcuate length, as indicated by the dotted lines in Fig. 1. The hubs 12 and 15 are separated from each other and from their respective shafts by insulating material 18 of any suitable type, and the parts are further secured in position by means of the nuts 19. Below the hubs 12 and 15, respectively, are brushes 20, 21 mounted in guides 22 secured in the bracket 23 of insulating material upon the casing by nuts 24.

Mounted in the panel 1 is the socket 25 which carries a lamp 26 of any desired color, preferably red. To the poles of this lamp are connected wires 27, 28 adapted to transmit current through the guides 22 to the brushes 20, 21, respectively, the arrangement being such that when the blocks 14, 17 are brought into alignment, current from the battery 29 will energize the lamp. Thus, the pointer 11 being set to indicate the predetermined maximum speed of travel by turning the knob 9, when the vehicle reaches this speed the blocks 14, 17 will make contact and the lamp will be lighted.

It is contemplated that the warning light will be large and bright enough to attract the attention of the operator of the vehicle without any effort on his part, and to this end and purpose the lamp, instead of being located in the instrument panel as shown, may be mounted in the dash at a point immediately in front of the driver when the panel itself is not so located.

While I have herein described and shown a preferred embodiment of my invention, it will be readily understood by those skilled in the art that the same may be modified in various ways to meet any particular or peculiar requirement, without departing from the spirit of my invention. For example, instead of the visible signal herein shown and described, I may employ any convenient form of sound signal, such as a bell or whistle, calculated to readily attract the attention of the operator.

Having thus described my said invention, what I claim and desire to secure by Letters Patent of the United States is:

1. In combination, a housing adapted for the reception of a speed responsive mechanism, said housing having end closures, one of said end closures comprising an indicia bearing dial, a sleeve having its ends rotatably journaled in said end closures and adapted to be moved rotatably by a speed responsive mechanism enclosed in said housing, an indicator element attached to the end of said sleeve externally of said dial, a contactor attached to the other end of said sleeve externally of the other closure, a shaft extending through said sleeve and rotatably supported thereby with its ends projecting from the ends of said sleeve, an indicator on said shaft externally of said dial, a handle on said shaft for manually rotating the same and a contactor mounted on the other end of said shaft and adapted for engagement with said first named contactor.

2. In combination, a housing adapted for the reception of a speed responsive mechanism, said housing including end walls, one of said end walls comprising an indicia bearing dial, bearings in said end walls, a sleeve rotatably journaled in said bearings and having its ends projecting through said end walls, said sleeve being adapted to be moved rotatably by a speed responsive mechanism enclosed in said housing, an indicating element attached to the end of said sleeve projecting externally of said dial, a contactor attached to the other end of said sleeve which projects externally of the other end wall, a shaft rotatably received in said sleeve with its ends extending outwardly of the ends thereof, an indicator element on said shaft adjacent to said first named indicator element, a handle on said shaft for manually rotating the same, and a contactor on the other end of said shaft and adapted for engagement with the said other contactor.

3. In combination, a housing adapted for the reception of a speed responsive mechanism, said housing having end walls, a sleeve rotatably journaled in said end walls and having its opposite ends projecting outwardly of said end walls respectively, an indicator element mounted on one end of said sleeve, a contactor mounted on the other end of said sleeve, a shaft extending through said sleeve with its opposite ends projecting outwardly thereof, an indicator element mounted on a projecting end of said shaft adjacent to said first named indicator element, a handle on the projecting end supporting said indicator element for manually rotating said shaft, and a contactor mounted on the other projecting end of said shaft.

4. In combination, a housing adapted for the reception of a speed responsive mechanism, said housing having end walls, a sleeve rotatably journaled in said end walls and having its opposite ends projecting outwardly of said end walls respectively, an indicator element mounted on one end of said sleeve, a radially extending contact bearing arm mounted on the other end of said sleeve, a shaft extending through said sleeve with its opposite ends projecting outwardly thereof, an indicator element mounted on the projecting end of said shaft adjacent to said first named indicator element, means on the said projecting end of said shaft for manually rotating the same, and a radially extending contact bearing arm mounted on the other projecting end of said shaft.

FRANCIS LOHMAN.